(12) United States Patent
Demulder et al.

(10) Patent No.: US 10,298,656 B2
(45) Date of Patent: May 21, 2019

(54) EXTENDING REPRESENTATIONAL STATE TRANSFER APPLICATION PROGRAM INTERFACE (REST API) FUNCTIONALITY

(71) Applicant: Western Digital Technologies, Inc., San Jose, CA (US)

(72) Inventors: Timothy Demulder, Zwijnaarde (BE); Wim De Waegeneer, Ghent (BE)

(*) Notice: Subject to any disclaimer, the term of this patent is extended or adjusted under 35 U.S.C. 154(b) by 206 days.

(21) Appl. No.: 15/176,953

(22) Filed: Jun. 8, 2016

(65) Prior Publication Data
US 2017/0359400 A1    Dec. 14, 2017

(51) Int. Cl.
| G06F 15/16 | (2006.01) |
| H04L 29/08 | (2006.01) |
| G06F 8/65 | (2018.01) |
| G06F 17/30 | (2006.01) |
| G06F 8/70 | (2018.01) |
| G06F 8/71 | (2018.01) |

(52) U.S. Cl.
CPC ........... *H04L 67/02* (2013.01); *G06F 8/65* (2013.01); *G06F 8/66* (2013.01); *G06F 8/70* (2013.01); *G06F 8/71* (2013.01); *G06F 17/30* (2013.01); *G06F 17/3023* (2013.01); *G06F 17/30309* (2013.01); *G06F 17/30548* (2013.01); *H04L 67/10* (2013.01); *H04L 67/32* (2013.01)

(58) Field of Classification Search
CPC ..... H04L 69/329; G06F 8/71; G06F 17/2288; G06F 17/30309; G06F 17/30578; G06F 17/30876; G06F 17/3023; G06F 17/30; G06F 17/30548; G06F 8/65; G06F 8/66; G06F 8/70
See application file for complete search history.

(56) References Cited

U.S. PATENT DOCUMENTS

| 2006/0161516 A1* | 7/2006 | Clarke ............ G06F 17/30578 |
| 2014/0244708 A1* | 8/2014 | Taine .................... H04L 65/40 709/201 |
| 2016/0162425 A1* | 6/2016 | Accapadi ............ G06F 13/364 710/111 |
| 2016/0350107 A1* | 12/2016 | Bragg, Jr. ................ G06F 8/71 |
| 2017/0344540 A1* | 11/2017 | Pidduck ........... G06F 17/30011 |

* cited by examiner

*Primary Examiner* — Joseph E Avellino
*Assistant Examiner* — Rachel J Hackenberg
(74) *Attorney, Agent, or Firm* — Patent Law Works LLP

(57) ABSTRACT

The present disclosure relates to a system and methods for extending the REST API. In particular, the disclosure relates to methods including receiving a request to modify a first version of a resource in a first collection, the first version of the resource associated with a first identifier identifying the first version of the resource as a current version of the resource; moving the first version of the resource to a second collection; associating the first version of the resource with a second identifier identifying the first version of the resource as a previous version of the resource; modifying the first version of the resource to generate a second version of the resource; saving the second version of the resource to the first collection; and associating the second version of the resource with the first identifier identifying the second version of the resource as the current version of the resource.

20 Claims, 7 Drawing Sheets

EXTENDING REPRESENTATIONAL STATE TRANSFER APPLICATION PROGRAM INTERFACE (REST API) FUNCTIONALITY

FIELD OF THE INVENTION

The present disclosure relates to the Representational State Transfer Application Program Interface (REST API). In particular, the present disclosure relates to systems and methods of providing additional functionality when using the REST API.

BACKGROUND

The REST API is an architectural style and communication approach commonly used in the development of Web Services. REST is stateless, resource-based and generally runs over Hypertext Transfer Protocol (HTTP). A first issue is that the stateless-ness of REST complicates versioning or history tracking for the resources. Existing solutions for versioning and history tracking include maintaining change or "delta" information regarding document attributes that must be merged with each previous version to get a complete overview of the document at a point in time or saving previous versions in an attribute list (rather than a separate collection), which increases the size of the resource that must be retrieved, and potentially filtered, with each call by the size of the document each time a revision is made. Accordingly, a system and method that provides versioning or tracking without adding significant overhead when using the current version of the resource may be desirable.

A second issue is that REST uses a Global Unique Identifier (GUID) to identify the resources. While GUIDs are great for machines, they are not easily used by humans. For example, it is much easier for a user to use a primary key (e.g., a Media Access Control (MAC) address) that identifies a resource (e.g., a machine) than a GUID which may be a 32 bit hexadecimal number. However, a primary key may change, which could make a system using primary keys unreliable. Accordingly, a mechanism that allows use of a primary key or a GUID to identify a resource while maintaining the reliability of a GUID-only system may be desirable (e.g., to reduce network traffic or burden on a client from which the request was received).

A third issue is that REST provides no mechanism for queueing a request when an intermittent error occurs. For example, if a resource is requested and that requested resource is presently unavailable (e.g., locked), the user will receive an error message (e.g., HTTP status code 423), which the client must then handle (e.g., by retrying). Accordingly, a mechanism by which a request may be queued on the server-side and retried may be desirable.

At least one system and method are disclosed herein that at least partially address one or more of the aforementioned issues.

SUMMARY

Systems and methods for extending REST API functionality are disclosed. For example, in some implementations, a system includes one or more processors and a memory storing instructions that cause the one or more processors to receive a request to modify a first version of a resource in a first collection, the first version of the resource associated with a first identifier, the first identifier identifying the first version of the resource as a current version of the resource; move the first version of the resource to a second collection; associate the first version of the resource with a second identifier, the second identifier identifying the first version of the resource as a previous version of the resource; remove the association of the first identifier with the first version of the resource; modify the first version of the resource according to the request to generate a second version of the resource; save the second version of the resource to the first collection; and associate the second version of the resource with the first identifier, the first identifier identifying the second version of the resource as the current version of the resource.

Other implementations of one or more of these aspects include corresponding systems, apparatus, methods, and computer programs, configured to perform the actions of the methods, encoded on computer storage devices. It should be understood that the above is not all-inclusive and many additional steps, features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

Various systems and methods for extending REST API functionality are disclosed. While the systems and methods of the present disclosure are described in the context of a particular system architecture, it should be understood that the systems and methods can be applied to other architectures and organizations of hardware.

Figure 1:
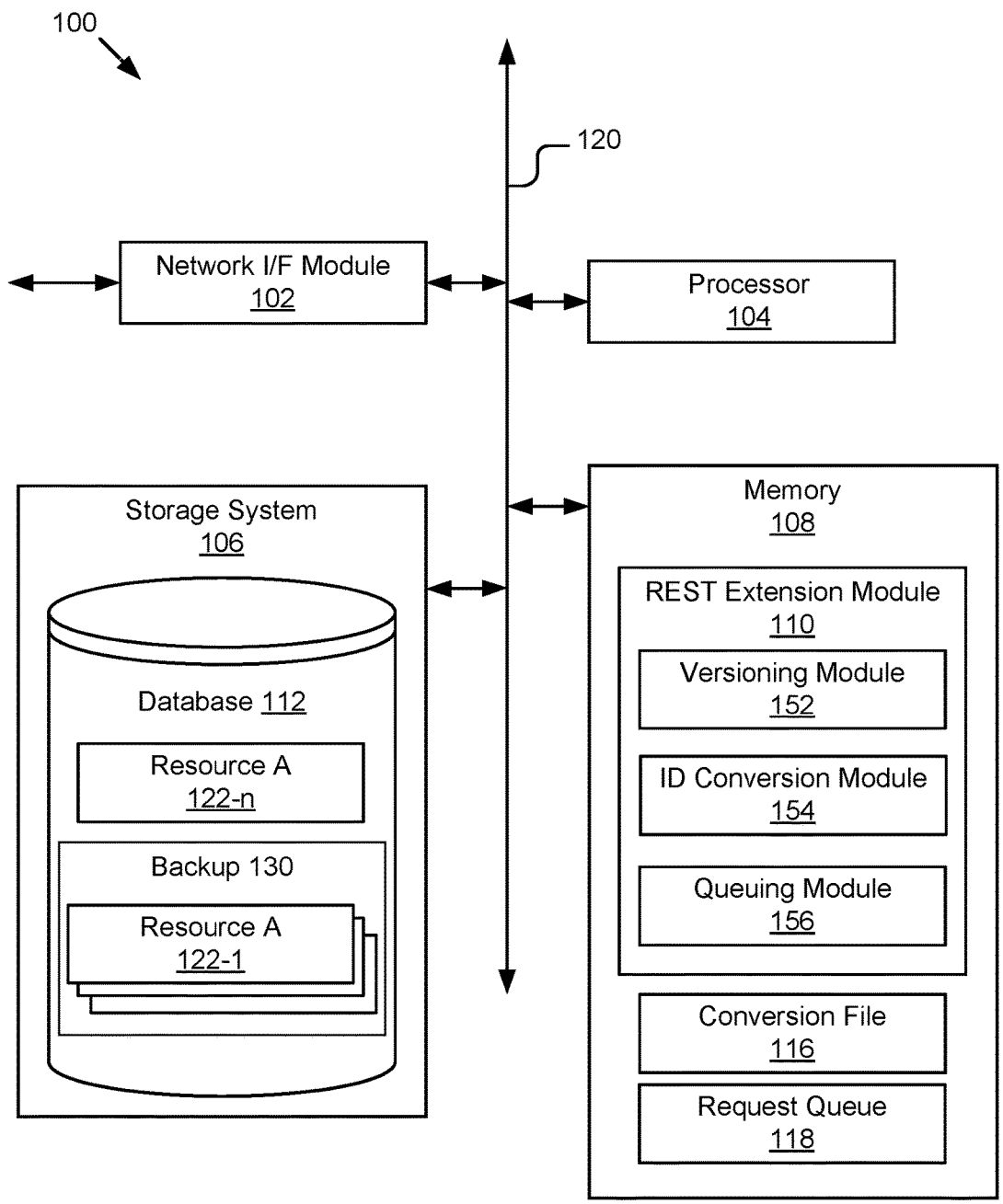
FIG. 1 is a block diagram illustrating an example system configured to extend REST API functionality.

FIG. 1 is a block diagram illustrating an example system 100 configured to implement the techniques introduced herein. In one implementation, the system 100 is a server device. A server device can be any computing device including one or more memory and one or more processors, for example, a laptop computer, a desktop computer, a tablet computer, a mobile telephone, or any other electronic device capable of responding to requests (e.g., read, write, etc.) from a client device that makes requests to the server.

The system 100 may include a network interface (I/F) module 102, a processor 104, a storage system 106, and a memory 108. The components of the system 100 are communicatively coupled to a bus or software communication mechanism 120 for communication with each other.

In some implementations, software communication mechanism 120 may be an object bus (e.g., Common Object Request Broker Architecture (CORBA)), direct socket communication (e.g., Transmission Control Protocol/Internet Protocol (TCP/IP) sockets) among software modules, remote procedure calls, User Datagram Protocol (UDP) broadcasts and receipts, HTTP connections, function or procedure calls, etc. Further, any or all of the communication could be secure (Secure Shell (SSH), HTTP Secure (HTTPS), etc.). The software communication mechanism 120 can be implemented on any underlying hardware, for example, a network, the Internet, a bus, a combination thereof, etc.

The network interface (I/F) module 102 is configured to connect system 100 to a network and/or other system. For example, network interface module 102 may enable communication through one or more of the Internet, cable networks, and other wired networks. The network interface module 102 links the processor 104 to a network that may in turn be coupled to other processing systems (e.g., a client device). The network interface module 102 also provides other conventional connections to the network for distribution and/or retrieval of files and/or media objects using standard network protocols such as TCP/IP, HTTP, HTTPS and Simple Mail Transfer Protocol (SMTP) as will be understood. In some implementations, the network interface module 102 includes a transceiver for sending and receiving signals using Wi-Fi, Bluetooth®, or cellular communications for wireless communication.

The network interface module 102 may allow client and/or server devices to store data to and retrieve data from the storage system 106, for example, across a network. For example, the network interface module 102 may allow one or more components of the system 100 to act as network accessed storage or as an array of storage devices.

The network can be one of a conventional type, wired or wireless, and may have numerous different configurations including a star configuration, token ring configuration, or other configurations. Furthermore, the network may include a local area network (LAN), a wide area network (WAN) (e.g., the Internet), and/or other interconnected data paths across which multiple devices may communicate. In some implementations, the network may be a peer-to-peer network. The network may also be coupled with or include portions of a telecommunications network for sending data using a variety of different communication protocols. In some implementations, the network may include Bluetooth (or Bluetooth low energy) communication networks or a cellular communications network for sending and receiving data including via short messaging service (SMS), multimedia messaging service (MMS), hypertext transfer protocol (HTTP), direct data connection, Wireless Application Protocol (WAP), email, etc.

The processor 104 may include an arithmetic logic unit, a microprocessor, a general purpose controller or some other processor array to perform computations and provide electronic display signals to a display device. In some implementations, the processor 104 is a hardware processor having one or more processing cores. The processor 104 is coupled to the bus 120 for communication with the other components of system 100. Processor 104 processes data signals and may include various computing architectures including a complex instruction set computer (CISC) architecture, a reduced instruction set computer (RISC) architecture, or an architecture implementing a combination of instruction sets. Although only a single processor is shown in the example of FIG. 1, multiple processors and/or processing cores may be included. It should be understood that other processor configurations are possible.

The memory 108 stores instructions and/or data that may be executed by the processor 104. The memory 108 is coupled to the bus 120 for communication with the other components of the system 100. The instructions and/or data stored in the memory 108 may include code for performing any and/or all of the techniques described herein. The memory 108 may be, for example, non-transitory memory such as a dynamic random access memory (DRAM) device, a static random access memory (SRAM) device, flash memory or some other memory device. In some implementations, the memory 108 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device.

In some implementations, the memory 108 stores a REST extension module 110, which extends the functionality of the REST API. In the illustrated implementation, the REST extension module 110 includes a versioning module 152, an ID conversion module 154 and a queuing module 156. However, it should be recognized that, as described below, each of the versioning module 152, the ID conversion module 154 and the queuing module 156 individually extend the functionality of the REST API. Therefore, in some implementations, the REST extension module 110 may omit one or two (depending on the implementation) of the versioning module 152, the ID conversion module 154 and the queuing module 156 and functionality corresponding to the omitted module(s). In some implementations, the extension module 110 may be implemented as a portion of the code for the REST API.

In some implementations, the REST extension module 110 includes a queuing module 156, which maintains a request queue 118. In some implementations, the request queue 118 is stored in the memory 108 as illustrated in FIG. 1.

In some implementations, the REST extension module 110 includes an ID conversion module 154, which maintains a conversion file 116. In some implementations, the conversion file 116 is stored in the memory 108 as illustrated in FIG. 1.

In some implementations, the REST extension module 110 includes a versioning module 152 (described in detail with regard to FIG. 2), and the storage system 106 stores a current version of a resource (e.g., Resource A 122-$n$, which is the nth version of Resource A) and a backup 130 with prior version(s) of that resource (e.g., prior version Resource A 122-1 and intermediary versions between 122-1, which is the $1^{st}$ version, and 122-$n$, which is the current and $n^{th}$ version). In some implementations, the current version of a resource (e.g., Resource A 122-$n$) and the collection of prior version(s) (e.g., backup 130) are stored in the same database 112 so that the versioning of a resource (e.g., backup 130) is backed up when the database that includes the resource (e.g., Resource A 122-$n$) is backed up. It should be recognized that while a single resource is illustrated in FIG. 1, many resources and many types of resources (e.g., machines, clusters, documents, etc.) may be present and are within the scope of this disclosure.

The storage system 106 is a data storage system that may store information on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. However, as illustratively described herein, the information is stored on disks of hard disk drives (HDD). The storage device(s) of the storage system 106 may be included in one or more enclosures housed in the same location or physically distributed to disparate locations across a storage area network.

Figure 2:
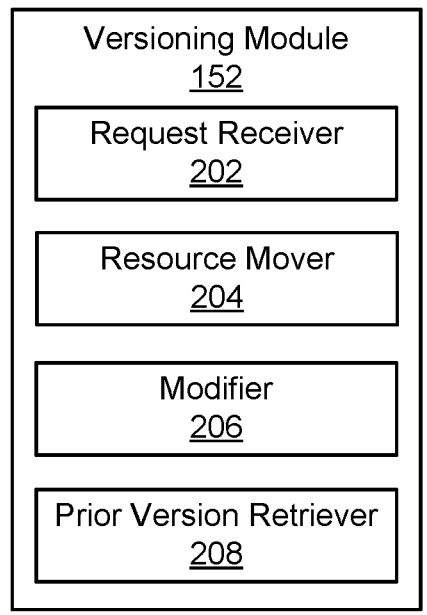
FIG. 2 is a block diagram illustrating an example versioning module according to one implementation.

FIG. 2 is a block diagram illustrating an example versioning module 152 according to one implementation. In the illustrated implementation, the versioning module 152 includes a request receiver 202, a resource mover 204, a modifier 206 and a prior version retriever 208. However, it should be recognized that FIG. 2 is merely one implementation and other implementations may include different components or organizations.

The request receiver 202 receives a request that includes one or more of a request for modification and a versioning request. A request for modification is a request to modify a resource (e.g., a document). In one implementation, the request receiver 202 receives a request for modification that is an HTTP request. For example, the request receiver 202 receives a PUT, POST or DELETE request. A versioning request is a request for information associated with a prior version of a resource. Examples of information associated with a prior version of a resource may include, but are not limited to, all prior versions of a resource, a subset of prior versions of a resource (e.g., version(s) during a certain period of time, the last X versions, etc.), a particular prior version of a resource (e.g., the version that existed at date Y, an immediately preceding version, etc.), etc.

The resource mover 204 moves a copy of a resource from a first collection to a second collection responsive to the request receiver 202 receiving a request for modification of the resource. For example, assume the request receiver 202 receives a request for modification of Resource A 122-1. Also, assume that Resource A 122-1 is a resource with no previous versions and is associated with the following metadata:
Resource A:
*id: 123
*name: my_resource_a
*description: "My resource A"
*backup: None In one implementation, the resource mover 204 moves a copy of Resource A 122-1 to a second collection by saving a copy of Resource A 122-1 to the second collection. For example, the resource mover 204 saves Resource A 122-1 to the backup 130, which is where Resource A 122-1 is illustrated in FIG. 1.

The modifier 206 applies the requested modification and manages one or more identifiers for versioning. With regard to Resource A 122-1, which was moved to the second collection, the modifier 206 generates and applies a new identifier (e.g., identifier "124") and associates that identifier with Resource A 122-1, which was moved to the second collection. Therefore, the metadata associated with Resource A 122-1 in the second collection may include:
Resource A:
*id: 124
*name: my_resource_a
*description: "My resource A"
*backup: None The modifier 206 applies the requested modifications to the resource. For example, in implementations where a copy of Resource A 122-1 was saved to backup 130 and a copy remains in the first collection, the modifier 206 applies the requested modifications to the copy remaining in the first collection, which shall be referenced as Resource A 122-2 (to clarify that this is a modified and, therefore, second version of Resource A 122). The modifier 206 manages the one or more identifiers associated with versioning for the modified resource (i.e., Resource A 122-2) to identify the modified resource as the current version of the resource and to identify one or more prior versions of the resource. Therefore, the metadata associated with Resource A 122-2 in the second collection may include:
Resource A:
*id: 123
*name: my_resource_a
*description: "My modified resource A"
*backup: 124

Note that the "id" of "123" was associated with the Resource A 122-1 (i.e., the version of the resource prior to modification) and is now associated with Resource A 122-2 (i.e., the current version of the resource, which incorporates the requested modification). In one implementation, the modifier 206 manages the one or more identifiers so that the same identifier is associated with the current version of a resource regardless of how many modifications/versions have been made. This may beneficially eliminate the need to look up or track the id of the most recent version, since the client can request the resource with id "123" and be assured that the client will receive the most-up-to-date version of Resource A (i.e., Resource A 122-*n*).

Also, note that the modifier 206 has entered "124" as the "backup" and that "124" is the identifier associated with the previous version Resource A 122-1, which has been saved in the second collection. Therefore, Resource A 122-2 is associated with a first identifier (i.e., 123 in this example) that identifies it as the current version of the resource and a second identifier (i.e., 124) that identifies the previous version of the resource (i.e., Resource A 122-1). The description may be modified based on user input, while the modifier 206 automatically manages the "id" and "backup" identifiers. It should be noted that the names of the fields and the form of the identifiers (i.e., as a three digit integers) are merely examples selected for clarity and convenience, and the disclosure is not limited to these examples. For example, the fields may have different names, and the identifiers may be different (e.g., 32 bit hexadecimal numbers). It should further be recognized that additional field(s) may be included (e.g., a timestamp indicating when the version was created).

Requests for modification beyond the first modification may be handled differently by the modifier 206 depending on the implementation. In one implementation, the current version of the resource includes metadata identifying the immediately preceding version of the resource. For example, assume another modification is requested, a copy of Resource A 122-2 is saved to the backup 130 by the resource mover 204, and the modifier 206 saves a modified version of Resource A 122-2 (i.e., Resource A 122-3, which is a third version) by applying the requested modifications. In one implementation, the metadata associated with Resource A 122-2, which is now in the backup 130, may be:
Resource A:
*id: 125
*name: my_resource_a

*description: "My modified resource A"
*backup: 124

Note that version 2 (Resource A 122-2) is now associated with an "id" of "125" as it is no longer the current version of Resource A. In one implementation, the modifier 206 manages the identifiers so that the metadata associated with Resource A 122-3, which is stored in the first collection (e.g., the "live" collection), may be:

Resource A:
*id: 123
*name: my_resource_a
*description: "Modified Again"
*backup: 125

Note that version 3 (Resource A 122-3) is now associated with an "id" of "123" as it is the current version of Resource A and references "125" (version 2—Resource A 122-2), but does not reference "124" (version 1—Resource A 122-1).

In another implementation, the current version of the resource includes metadata identifying previous versions (e.g., a chain of versions linking back to the original version). As in the example above, assume modification to the second version of Resource A (i.e., Resource A 122-2) is requested, a copy of Resource A 122-2 is saved to the backup 130 by the resource mover 204, and the modifier 206 saves a modified version of Resource A 122-2 (i.e., Resource A 122-3, which is a third version) by applying the requested modifications. The metadata associated with Resource A 122-2, which is in the backup 130, may be the same as above:

Resource A:
*id: 125
*name: my_resource_a
*description: "My modified resource A"
*backup: 124

However, in one implementation, the modifier 206 manages the identifiers so that the metadata associated with Resource A 122-3, which is stored in the first collection (e.g., the "live" collection), may be:

Resource A:
*id: 123
*name: my_resource_a
*description: "Modified Again"
*backup: 125
  *id: 125
  *name: my_resource_a
  *description: "My modified resource A"
  *backup: 124
    *id: 124
    *name: my_resource_a
    *description: "My resource A"
    *backup: None Regardless, the use of identifiers and versioning as described above keeps the current version of the resource "lighter" (i.e., less resource intensive to access and work with) than alternatives such as maintaining change or "delta" information regarding document attributes that must be merged with each previous version to get a complete overview of the document at a point in time or saving previous versions in an attribute list (rather than a separate collection) which increases the size of the resource that must be retrieved and potentially filtered with each call by the size of the document each time a revision is made.

The prior version retriever 208 receives a versioning request for information associated with one or more prior versions of a resource and responds to the versioning request. As discussed above, there may be one or more types of version requests, and the operations performed by the prior version retriever may vary based on the type of versioning request. However, the prior version retriever 208 utilizes one or more "backup" identifiers identifying a prior version of a resource to obtain the requested information and respond to the versioning request.

Figure 3:
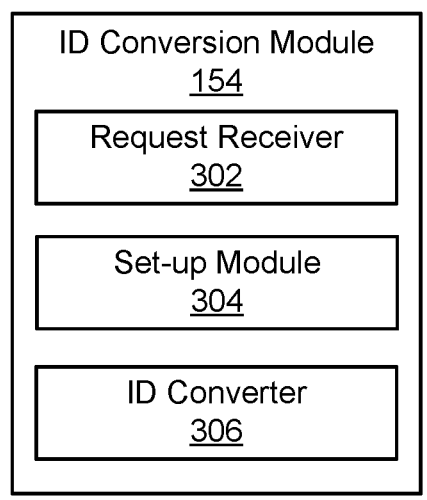
FIG. 3 is a block diagram illustrating an example of an ID conversion module according to one implementation.

FIG. 3 is a block diagram illustrating an example of an identifier (ID) conversion module 154 according to one implementation. In the illustrated implementation, the ID conversion module 154 includes a request receiver 302, a set-up module 304 and an ID converter 306. However, it should be recognized that FIG. 3 is merely one implementation and other implementations may include different components.

The request receiver 302 receives a request for conversion and passes the request for conversion to the ID converter 306. A request for conversion is a request that includes a primary key for conversion into a GUID or a request to resolve a GUID into a primary key.

The set-up module 304 manages resource definitions and associations between primary keys and GUIDs. A resource definition defines which attribute(s) can be converted and to which resource type they should be converted. For example, a machine definition may include information similar to:

Resource: Machine
*name: string|primary key
*description: string
*location: reference(location)

The above resource definition indicates that a machine may be defined by a name, which is a string that acts as a primary key (that can be converted), a description, which is a string, and a location that references another resource definition (i.e., a location definition). In one implementation, the resource definition for a location resource may include information similar to Resource: Location
*name: string|primary key The above resource definition indicates that a location may be defined by a name, which is a string that acts as a primary key (which can be converted).

The set-up module 304 also manages associations between primary keys and GUIDs. For example, in one implementation, the set-up module 304 maintains a table (in a relation implementation) or a document or other data structure (in a non-relational implementation), which associates a primary key with a GUID. For example, the set-up module 304 maintains an association between "Utah_Central_Office" (a primary key for a location) and the GUID "96649633-2435-4f84-a877-dd9db5431bb8" and maintains an association between "machine 1" (a primary key for a machine) and the GUID "d636d90e-f33b-4d38-8277-94048b2cdbb9." In one implementation, the associations are automatically generated and maintained. For example, in some implementations, when the user creates "machine 1" as described below, the set-up module 304 automatically associates "machine 1" (a primary key for a machine) and the GUID "d636d90e-f33b-4d38-8277-94048b2cdbb9" upon adding "machine 1" to the system. The resource definitions and associations between primary keys and GUIDs may collectively be referred to as conversion files 116.

The ID converter 306 converts between a primary key and a GUID. In one implementation, the ID converter 306 may convert from a primary key to a GUID or from a GUID to a primary key.

In order to better understand the ID converter 306, it may be beneficial to consider a scenario in which a user wants to add a machine in a certain location. Without the ID conversion module 154, a user would 1) query the API to find the location by name (GET), 2) obtain the location's unique identifier from the response data, 3) add the location's unique identifier to the machine request data, and 4) create the new machine using the API (POST). Since the location's user identifier (GUID) may be large and cumbersome (e.g., 96649633-2435-4184-a877-dd9db5431bb8) and requires multiple API calls, the process is neither optimized nor user friendly.

In the above scenario, in which a user wants to add a machine in a certain location, with the ID conversion module 154, a user may simply provide the following:

```
POST https://127.0.0.1/model/machine/
REQUEST: {
    "machine": {
        "name": "machine1",
        "status": "ONLINE",
        "location": "Utah_Central_Office"
    }
}
```

The ID converter 306 obtains the resource definition for a machine, determines that the "location" attribute is a reference to a location resource definition based on the resource definition for the machine, and looks up the unique identifier associated with the "Utah_Central_Office" primary key based on the location resource definition. The ID converter 306 replaces the location attribute value with the unique identifier before the machine is saved. By replacing the primary key "Utah_Central_Office" with a unique identifier (e.g., the GUID 96649633-2435-44-a877-dd9db5431bb8), the ID converter 306 ensures that the link between the machine and the location persists, even if the location name (primary key) changes. In one implementation, the ID converter also includes the unique identifier in the API response data to notify the user that the primary key was successfully replaced with the unique identifier. For example, the returned response data may include information similar to:

```
POST https://127.0.0.1/model/machine/
RESPONSE: {
    "machine": {
        "guid": "d636d90e-f33b-4d38-8277-94048b2cdbb9"
        "name": "machine1",
        "status": "ONLINE",
        "location": "96649633-2435-4f84-a877-dd9db5431bb8"
    }
}
```

If the unique identifier for the location had been initially provided by the user, the ID converter 306 would not need to perform a conversion, and the addition of the machine to the location would have proceeded as it does in the un-extended REST API. Therefore, in some implementations, the ID conversion module 154 provides the capability to handle the use of primary keys, unique identifiers or a mixture thereof by users.

In one implementation, the ID converter 306 may convert from a unique identifier to a primary key. This may also be referred to herein as resolving. In one implementation, the ID converter 306 resolves a unique identifier to a primary key responsive to a user specifying a "resolve" URL parameter. For example, when no resolve URL parameter is used:

```
GET https://127.0.0.1/model/machine/d636d90e-f33b-4d38-8277-94048b2cdbb9/
RESPONSE: {
    "machine": {
        "name": "machine1",
        "location": "96649633-2435-4f84-a877-dd9db5431bb8",
    }
}
```

However, when a resolve URL parameter is user, the ID converter 306 obtains the association between the location's GUID "d636d90e-f33b-4d38-8277-94048b2cdbb9" and the location's primary key "Utah_Central_Office" and returns the below response for the below request:

```
GET https://127.0.0.1/model/machine/d636d90e-f33b-4d38-8277-
94048b2cdbb9/?resolve
RESPONSE: {
    "machine": {
        "name": "machine1",
        "location": "Utah_Central_Office",
    }
}
```

It should be understood that the preceding example is provided for clarity and convenience and other resource definitions, primary keys, references, unique identifiers, scenarios, etc. are within the scope of this disclosure. It should also be understood from the description above that the ID conversion module 154 may increase efficiency (e.g., by reducing the number of calls and steps a user must undertake) and be more user friendly (e.g., by using more human-understandable primary keys).

Figure 4:
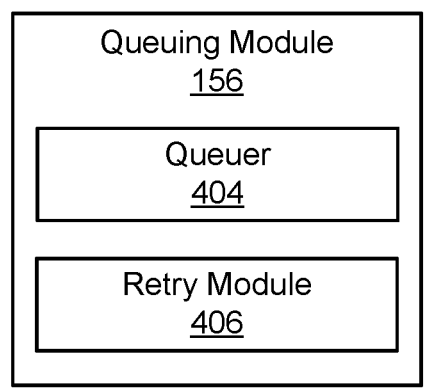
FIG. 4 is a block diagram illustrating an example of a queuing module according to one implementation.

FIG. 4 is a block diagram illustrating an example of a queuing module 156 according to one implementation. In the illustrated implementation, the queuing module 156 includes a queuer 404 and a retry module 406. However, it should be recognized that FIG. 4 is merely one implementation and other implementations may include different components or organizations.

The queuer 404 may receive a request associated with a resource that is unavailable. A resource being unavailable refers to an intermittent error, i.e., an error that the request may no longer exist (e.g., HTTP status code 423 Locked) unlike other errors (e.g., 404 NotFound or 403 NotAllowed).

In some implementations, queuing may be optional, and the user may need to opt-in or opt-out of having requests queued, and the queuer 404 determines whether queuing applies to the received request associated with a resource that is unavailable. Without a queuing module 156, the client maintains control of if or when a request is retried. Therefore, in some implementations a user may need to opt-in (e.g., by including a "?queue" URL parameter) to having the queuing module 156 queue a request on the server-side to be more consistent with the client-side control provided by the un-extended REST API.

The queuer 404 adds requests associated with a resource that is unavailable to a request queue 118, which may occasionally be referred to simply as a "queue." In one implementation, a request in the queue 118 is associated with one or more of a time and a priority, and the queue 118 is sorted according to one or more of the time and the priority. The time may include a timestamp indicating the time of the most recent attempt to execute the request. Depending on the implementation, the priority may be one or more of user assigned (e.g., at the time of the initial request) and rule based. In some implementations, the higher the priority and the older a request, the closer to the front of the queue 118 the queuer 404 puts the request. The relative impact of priority and age of a request in determining the queue order may vary depending on the implementation.

The retry module 406 processes queued requests. For example, the retry module 406 receives requests from the queue 118 and attempts to execute (e.g., by resubmitting the request) in the order in which the requests are queued. In some implementations, when the retry module 406 attempts to retry a request and the request again fails because a resource is unavailable, the queuer 404 receives the failed, retried request, associates the request with an updated time stamp and re-queues the request based on the priority and the updated time stamp. Additionally, requests can be removed from the queue by using a DELETE call on a request identifier associated with the request.

Figure 5:
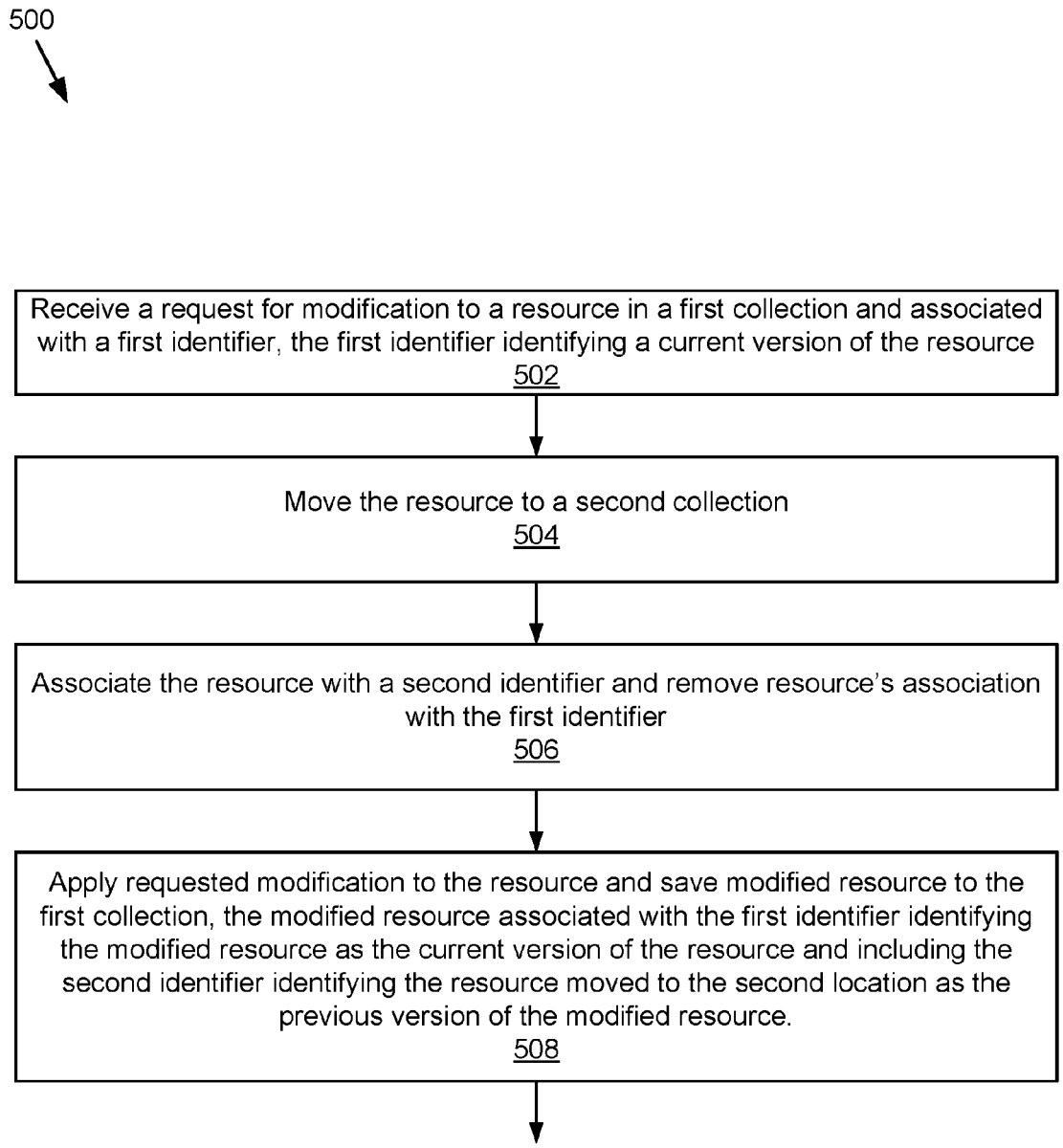
FIG. 5 is a flowchart of an example method for versioning a resource according to the techniques described herein.

FIG. 5 is a flowchart of an example method 500 for versioning a resource according to one implementation. At 502, the request receiver 202 of the versioning module 152 receives a request for modification to a resource in a first collection (e.g., a "live" collection). That resource is associated with an identifier identifying that the resource is the current version of the resource. At 504, the resource mover 204 moves the resource to a separate collection (e.g., backup 130). At 506, the modifier 206 associates the resource moved to the second collection with a second identifier and removes that resource's association with the first identifier identifying the resource as the current version of the resource. At 508, the modifier 206 applies the requested modification to the resource (e.g., PUT, POST, DELETE) and saves, to the first collection, the modified resource including the first identifier identifying the modified resource as the current version of the resource and including the second identifier identifying the resource moved to the second collection as the previous version of the modified resource.

Figure 6:
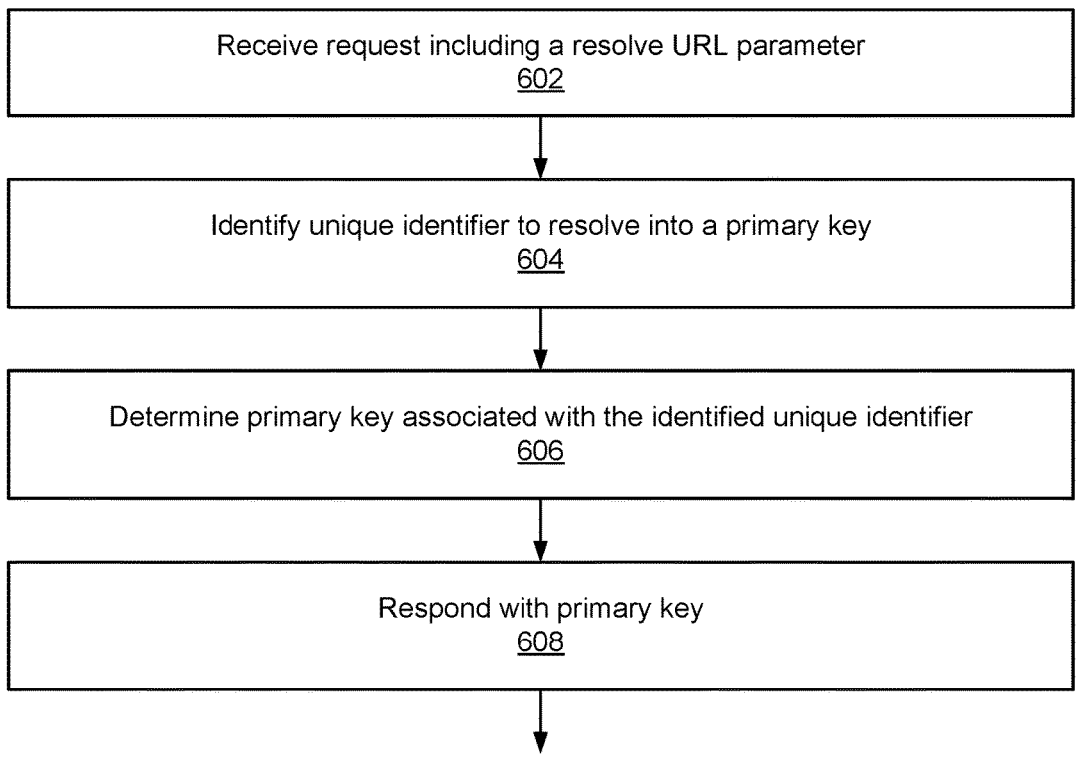
FIG. 6 is a flowchart of an example method for resolving a unique identifier to a primary key according to the techniques described herein.

FIG. 6 is a flowchart of an example method 600 for resolving a unique identifier to a primary key according to one implementation. At 602, the request receiver 302 of the ID conversion module 154 receives a request including a resolve parameter. At 604, the ID converter 306 identifies a unique identifier to resolve into a primary key. At 606, the ID converter 306 determines a primary key associated with the identified unique identifier. At 608, the ID converter 306 responds with the primary key.

Figure 7:
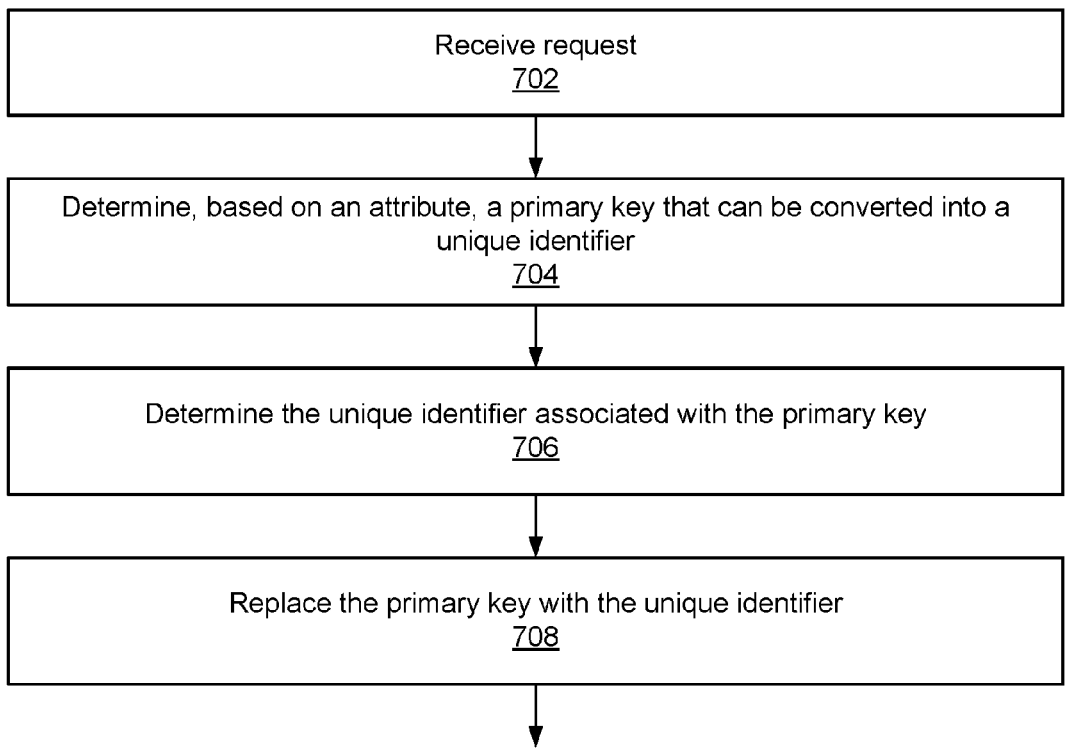
FIG. 7 is a flowchart of an example method for converting a primary key into a unique identifier according to the techniques described herein.

FIG. 7 is a flowchart of an example method 700 for converting a primary key into a unique identifier. At 702, the request receiver 302 of the ID conversion module 154 receives a request. At 704, the ID converter 306 determines, based on an attribute, a primary key that can be converted into a unique identifier. At 706, the ID converter 306 determines the unique identifier associated with the primary key. At 708, the ID converter 306 replaces the primary key with the unique identifier.

Figure 8:
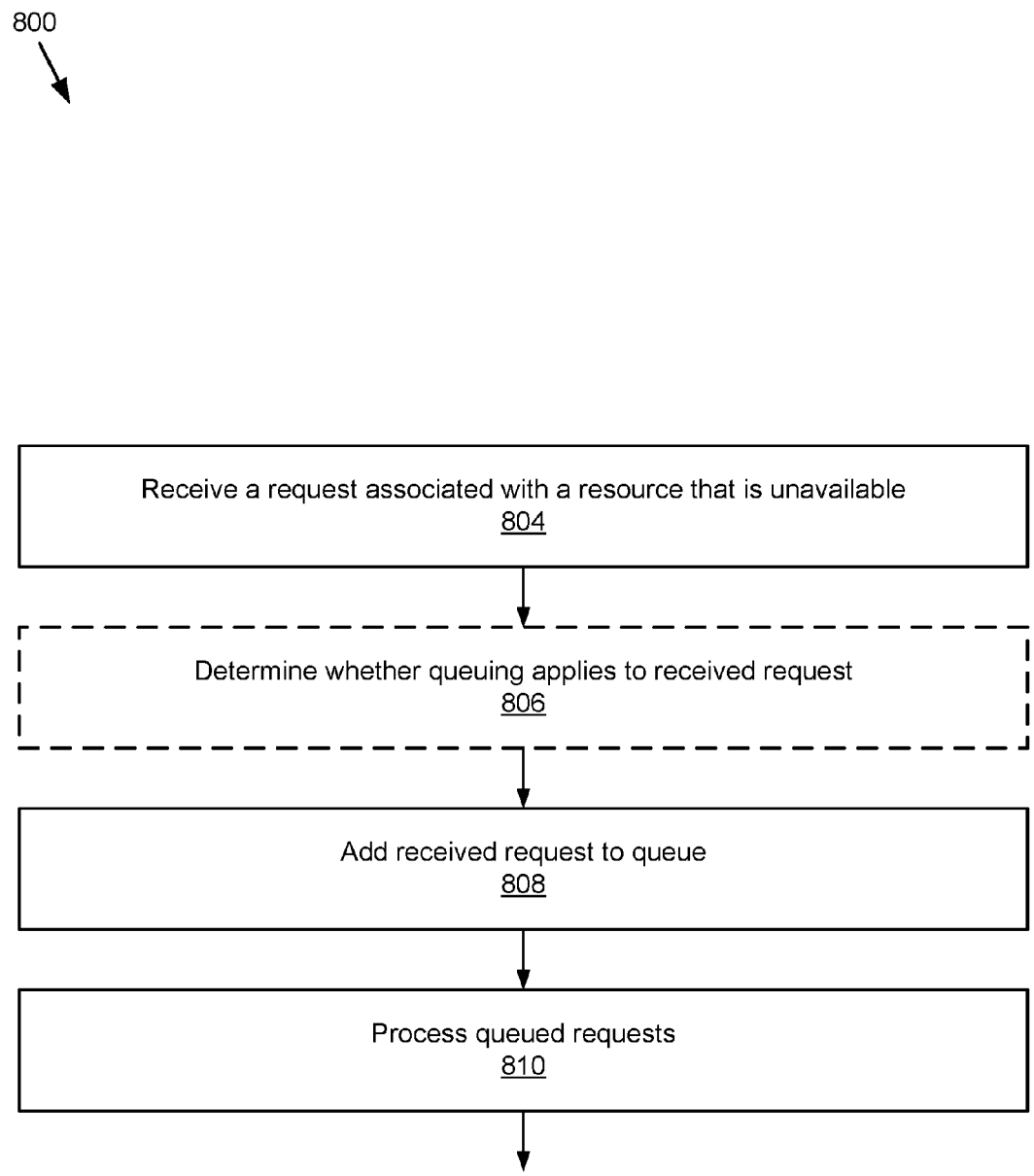
FIG. 8 is a flowchart of an example method for queuing a request according to the techniques described herein.

FIG. 8 is a flowchart of an example method 800 for queuing a request according to one implementation. At 804, the queuer 404 receives a request associated with a resource that is unavailable and adds the request to a queue 118 at 808. In some implementations, the queuer 404 determines, at 806, that queuing applies to the request before queuing the request at 808. At 810, the retry module 406 processes queued requests.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of REST; however, the disclosed technologies apply to other application program interfaces and protocols.

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above may be presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method comprising:
   receiving, using one or more processors, a request to modify a first version of a resource in a first collection, wherein the request is received through a representational state transfer application program interface (REST API), the first version of the resource associated with a first identifier corresponding to a first global unique identifier (GUID), the first identifier identifying the first version of the resource as a current version of the resource; and
   responsive to the request to modify:
      moving, using the one or more processors, the first version of the resource to a second collection;
      associating, using the one or more processors, the first version of the resource with a second identifier corresponding to a second GUID, the second identifier identifying the first version of the resource as a previous version of the resource;
      removing, using the one or more processors, the association of the first identifier with the first version of the resource;
      modifying, using the one or more processors, the first version of the resource according to the request to generate a second version of the resource;
      saving, using the one or more processors, the second version of the resource to the first collection; and
      associating, using the one or more processors, the second version of the resource with the first identifier, the first identifier identifying the second version of the resource as the current version of the resource.

2. The computer-implemented method of claim 1 further comprising:
   receiving a versioning request; and
   retrieving the second identifier identifying the first version of the resource as the previous version of the resource.

3. The computer-implemented method of claim 2 further comprising:
   retrieving the first version of the resource using the second identifier.

4. The computer-implemented method of claim 2, wherein the second version of the resource saved to the first collection includes the second identifier as metadata.

5. The computer-implemented method of claim 1, wherein the request is a hypertext transfer protocol (HTTP) request.

6. The computer-implemented method of claim 1, wherein the resource is one of a document, a machine, a location, or a cluster.

7. The computer-implemented method of claim 1 further comprising:
   determining that the resource is unavailable;
   adding the request to a queue; and
   processing the queued request.

8. The computer-implemented method of claim 7, wherein the request is associated with one or more of a time and a priority.

9. The computer-implemented method of claim 8, wherein the queued request is processed in an order based on one of the priority and the time associated with the queued request.

10. A system comprising:
a processor; and
a non-transitory computer usable medium storing instructions that, when executed by the processor, cause the system to:
receive a request to modify a first version of a resource in a first collection, wherein the request is received through a representational state transfer application program interface (REST API), the first version of the resource associated with a first identifier corresponding to a first global unique identifier (GUID), the first identifier identifying the first version of the resource as a current version of the resource; and
responsive to the request to modify:
move the first version of the resource to a second collection;
associate the first version of the resource with a second identifier corresponding to a second GUID, the second identifier identifying the first version of the resource as a previous version of the resource;
remove the association of the first identifier with the first version of the resource;
modify the first version of the resource according to the request to generate a second version of the resource;
save the second version of the resource to the first collection; and
associate the second version of the resource with the first identifier, the first identifier identifying the second version of the resource as the current version of the resource.

11. The system of claim 10 wherein the instructions, when executed by the processor, further cause the system to:
receive a versioning request; and
retrieve the second identifier identifying the first version of the resource as the previous version of the resource.

12. The system of claim 11 wherein the instructions, when executed by the processor, further cause the system to:
retrieve the first version of the resource using the second identifier.

13. The system of claim 10, wherein the request is a hypertext transfer protocol (HTTP) request.

14. The system of claim 10, wherein the resource is one of a document, a machine, a location or a cluster.

15. The system of claim 10 wherein the instructions, when executed by the processor, further cause the system to:
determine that the resource is unavailable;
add the request to a queue; and
process the queued request.

16. The system of claim 15, wherein the request is associated with one or more of a time and a priority.

17. The system of claim 16, wherein the queued request is processed in an order based on one of the priority and the time associated with the queued request.

18. A system comprising:
means for receiving a request to modify a first version of a resource in a first collection, wherein the request is received through a representational state transfer application program interface (REST API), the first version of the resource associated with a first identifier corresponding to a first global unique identifier (GUID), the first identifier identifying the first version of the resource as a current version of the resource; and
means for, responsive to the request to modify:
moving the first version of the resource to a second collection;
associating the first version of the resource with a second identifier corresponding to a second GUID, the second identifier identifying the first version of the resource as a previous version of the resource;
removing the association of the first identifier with the first version of the resource;
modifying the first version of the resource according to the request to generate a second version of the resource;
saving the second version of the resource to the first collection; and
associating the second version of the resource with the first identifier, the first identifier identifying the second version of the resource as the current version of the resource.

19. The system of claim 18, further comprising:
means for receiving a versioning request; and
means for retrieving the second identifier identifying the first version of the resource as the previous version of the resource.

20. The system of claim 19, further comprising:
means for retrieving the first version of the resource using the second identifier.

* * * * *